United States Patent Office

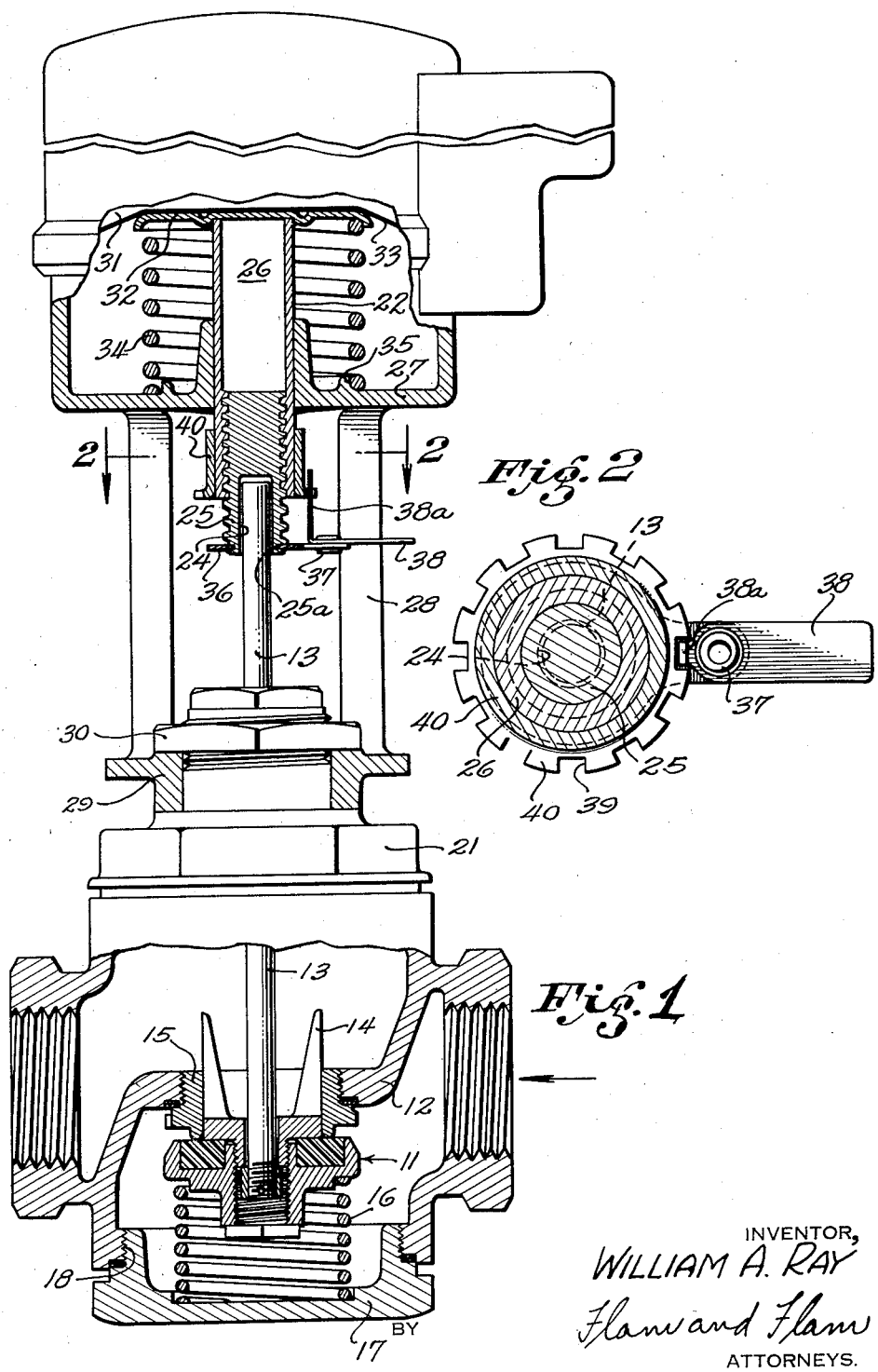

2,868,029
Patented Jan. 13, 1959

---

2,868,029

ADJUSTABLE TIME DELAY VALVE

William A. Ray, North Hollywood, Calif., assignor to General Controls Co., a corporation of California Application February 15, 1954, Serial No. 410,340

2 Claims. (Cl. 74—424.8)

This invention relates to slow operating mechanisms, and particularly to an adjustable connection between an actuator and a load such as the stem of a valve, whereby the time required to operate the mechanism after energization of the actuator can be controlled.

It is an object of the present invention to provide a simple apparatus that easily can achieve control of the time required to cause opening of a valve or the like.

It is another object of this invention to make it possible to adjust the setting of the mechanism by simple manipulation, without requiring any special tools, and in which the setting can be maintained against accidental change.

To accomplish these functions, use is made of a lost motion connection between a slow moving actuator and the load, such as a valve stem. A cupped element receives the end of the valve stem, and is adjustably carried by the slow moving actuator, the position of the element determining the extent of lost motion, and hence the time required after energization of the actuator to cause opening movement of the valve.

This invention possesses many other advantages, and has other objects which may be made more clearly apparent from a consideration of one embodiment of the invention. For this purpose, there is shown a form in the drawings accompanying and forming part of the present specification. This form will now be described in detail, illustrating the general principles of the invention; but it is to be understood that this detailed description is not to be taken in a limiting sense, since the scope of this invention is best defined by the appended claims.

Referring to the drawings:

Figure 1 is a longitudinal view, mostly in section, of a valve mechanism incorporating the present invention; and Fig. 2 is an enlarged sectional view, taken along the plane indicated by line 2—2 of Fig. 1.

In this instance the load to be operated is a valve structure. It may be of any suitable form. In the present instance the valve body is of the ported partition type. A closure structure 11, accommodated on the inlet side of the partition 12 is carried at the end of an elongate valve stem 13. The closure structure 11 carries a guide 14 cooperating with an apertured seat forming member 15 mounted on the partition 12.

The closure structure 11 is biased upwardly, corresponding to valve closing position. For this purpose, a helical compression spring 16 engages at opposite ends respectively the lower side of the closure and a recessed cap 17 closing a lower body opening 18.

The reciprocable valve stem 13 extends beyond the outlet side of the partition 12 and through a bonnet 21 closing an upper body opening. Suitable packing structure (not shown) carried in the bonnet 21 ensures against leakage along the stem 13. The upper end of the stem 13 is accessible above the valve body for operation thereof.

A longitudinally movable, generally tubular operator 26, in alignment above the stem 13, serves as the means for moving the stem 13. The operator 26 has an exterior cylindrical surface guidingly accommodated in an apertured boss 22 projecting upwardly from a horizontal wall 27. The wall 27 is secured upon a hollow, generally half-cylindrical shell 28 that in turn is secured to the valve bonnet 21. For this purpose, the shell 28 terminates in a ring 29 fitting about the bonnet and held thereon by a lock nut 30.

The operator 26 is longitudinally positioned in accordance with hydraulic conditions in a pressure space 31. For this purpose, the operator 26 is secured at its upper end to a flanged pressure plate 32. A diaphragm 33 seals the pressure space 31, and its central portion engages the upper surface of the plate 32. A helical compression spring 34 extending about this operator 26 engages the plate 32 within its depending peripheral flange. The spring 34 urges the plate 32 upwardly into engagement with the diaphragm and thus also urges the diaphragm upwardly into the pressure space 31 against the pressure of the fluid therein. The lower end turn of the spring 34 is seated about an annular wall 35 formed in the horizontal wall 27 of the support 28.

Hydraulic fluid such as oil may be forced into the pressure space 31 by a small displacement electric motor operated pump. As fluid is slowly pumped into the cylinder space 31, the plate 32 and operator 26 move downwardly toward the stem 13.

A connection is effected between the operator 26 and the stem 13 by the aid of a coupling member 25. The member 25 is carried in the lower end of the operator 26 by the aid of a threaded engagement with the operator 26. The threads may be of the square cut or acme type, and of substantial pitch. A multiple thread, such as a quadruple thread, may be used for this purpose. The coupling member 25 has an axial, downwardly opening recess 24 accommodating with clearance, the upper end of the stem 13. The stem 13 is moved downwardly to open the valve only after the bottom of the recess 24 engages the stem 13 in the course of the movement of the operator 26.

Normally the bottom of the recess 24 is spaced above the end of the stem 13 when the hydraulic mechanism is inoperative. The coupling member 25 thus engages the stem 13 only upon the passage of a finite time after initiation of the operation of the hydraulic system. Essentially, the stem 13 is moved by a lost motion mechanism. The stem 13 is returned to valve closing position by the spring 16 when the operator 26 carrying the member 25 is retracted. The compression spring 34 lifts the coupling member 25 when the pressure in the space 31 is relieved and when the hydraulic system is de-energized.

Since the time at which the valve closure 11 opens after initial operation of the mechanism, is dependent upon the spacing of the end of the valve stem 13 from the bottom of the recess 24 of the member 25, the time required for initial opening of the valve may readily be adjusted. This is accomplished by relatively rotating the coupling member 25 and the operator 26 to adjust the amount of lost motion between the coupling member 25 and the stem 13.

To facilitate relative angular movement between these parts, an arm 38 is provided. This arm 38 is attached by a hollow rivet 37 to a projection integrally formed at the peripheral portion of a split apertured disc 36. The disc 36 is secured about the lower end of the coupling member 25 and is seated in a peripheral groove 25a of the coupling member 25. The arm 38 is traversely bent substantially intermediate its length to form on one side of the band a finger or detent 38a extending upwardly from the disc 36 and in a direction parallel to the direction of movement of the operator 26. The arm 38 on the other side of the bend extends generally radially outwardly of the parts.

The finger or detent 38a, secured to the coupling member 25, normally enters one of a number of equiangularly spaced, outwardly opening slots 39 formed in an end flange of a sleeve 40. The sleeve 40 is press-fitted about that end of the hollow operator 26 that accommodates the coupling member 25.

The finger or detent 38 thus normally prevents angular movement between the coupling member 25 and the operator 26 and thus determines a definite geometrical relationship of parts and a definite lost motion.

The finger or detent 38a may be moved out of engagement with the slots 39. For this purpose, both the arm 38 and the disc 36 are of thin resilient material, whereby the detent 38a can be flexed outwardly from the corresponding slot. Depression of the arm 38 thus causes the operative portion of the detent 38a to move radially outwardly of the slotted flange. Angular movement of the arm 38 and the threaded adjusting member 25 to which it is secured can then be accomplished.

The arm 38 is accessible through the open part of the shell 28.

When the position of the member 25 has been adjusted, the detent 38a is released and permitted to enter the nearest slot. The longitudinal position of the member 25 and the amount of lost motion are thus changed.

By upwardly positioning the member 25 to increase the lost motion the time delay for operation of the load or valve is increased. By lowering the member 25 with respect to the operator 26 to decrease the lost motion the time delay for operation of the load is reduced.

The inventor claims:

1. In a device of the character described: a first movable member; a second movable member; said first member being adapted to position a load; said second member being engageable with said first member for operating said first member; means determining initial positions of said members in which said members are operatively spaced; a motor for slowly advancing said second member toward said first member; an abutment element carried by one of said members and interposed between them; means forming a threaded connection between said element and said one member for relative longitudinal movement therebetween in a direction corresponding to the direction of movement of said one member; a flexible resilient disc carried by said element; a flexible detent carried near the outer edge of the disc, and having one arm extending substantially radially of the disc and another arm extending transverse to the disc and eccentrically thereof; a circular member carried by said one member coaxially of said element and having a flange in which substantially equiangularly spaced outwardly directed slots are formed; said other arm of said detent being selectively engageable with any one of the slots for selectively preventing relative movement between said element and said one member.

2. In combination: a tubular operator movable from a limited retracted position to an advanced position, an exteriorly threaded member engaging within an end of the operator, a portion of said threaded member projecting beyond said end; said threaded member having an accessible recess; a load moving stem guidingly received in said recess; a resilient arm secured to said projecting end for angularly moving said threaded member to vary the spacing between the bottom of the recess and the end of said stem when said operator is in a retracted position, said resilient arm being flexible in a direction axially of said operator, said arm having a detent portion movable in a direction having a component extending radially of the operator upon flexure of said arm in said axial direction; and an outwardly flanged sleeve secured about the end of said operator, the flange of said sleeve having a series of substantially equiangularly spaced recesses for receiving said detent portion; said detent portion being releasable from the recesses upon digital pressure exerted upon said arm in a direction to move said arm axially.

References Cited in the file of this patent

UNITED STATES PATENTS

| | | |
|---|---|---|
| 113,455 | Scrannage | Apr. 4, 1871 |
| 692,717 | Schlachter | Feb. 4, 1902 |
| 1,137,454 | Bowser | Apr. 27, 1915 |
| 1,185,467 | Beauchamp | May 30, 1916 |
| 1,496,497 | Swarthout et al. | June 3, 1924 |
| 2,015,553 | Exner | Sept. 24, 1935 |
| 2,437,552 | Quiroz | Mar. 9, 1948 |
| 2,473,081 | Vaughan | June 14, 1949 |
| 2,493,783 | Stancliff | Jan. 10, 1950 |
| 2,496,215 | Jones | Jan. 31, 1950 |
| 2,500,750 | Holenza | Mar. 14, 1950 |
| 2,678,662 | Boteler | May 18, 1954 |
| 2,709,451 | La Bour | May 31, 1955 |